Patented Jan. 4, 1927.

1,613,211

UNITED STATES PATENT OFFICE.

LEROY C. WERKING, OF NEW YORK, N. Y., ASSIGNOR TO THE PREST-O-LITE COMPANY, INC., A CORPORATION OF NEW YORK.

PROCESS OF MAKING STORAGE-BATTERY ELEMENTS.

No Drawing. Application filed July 15, 1922. Serial No. 575,303.

This invention relates to the manufacture of storage battery elements, and particularly to processes of making porous electrodes and porous separators which are reenforced by an acid-resistant binder such as rubber, celluloid and the like.

In employing plastic acid-resistant material such as rubber and celluloid to bind the active material of an electrode or the fibrous material of a separator, the electrode or separator has a tendency to become impervious to the electrolyte when the binder sets. The principal objects of the present invention is to provide porous electrodes and separators containing binding materials such as those mentioned above.

Broadly speaking, the foregoing object is attained by incorporating a so-called porosity salt in the material employed in the manufacture of the electrode or separator. The salt should have the property of decomposing at a predetermined temperature,— somewhat below or about the temperature of vulcanization of rubber or the temperature of volatilization of the celluloid solvent, —in other words, the major portion of the decomposition of the salt should occur when the binder becomes sufficiently rigid to permanently retain the pores produced in it. Furthermore, the porosity salt should be one that may be decomposed by heat without leaving a residue or only an inert residue, and is desirably a salt like ammonium carbonate that decomposes entirely into gases.

In the manufacture of electrodes for example, the porosity salt, either in a dry state or as a solution, may be incorporated in a number of ways: (1) The salt may be mixed with the active material and decomposed after impregnating the active material with the plastic binder and upon heating the latter to set it; (2) the porosity salt may be incorporated in the plastic binder alone before the active material is impregnated with such binder; and (3) the porosity salt may be mixed with the active material and with the plastic acid-resistant binder before the mixture of the three is applied to the active material support. After applying the mixture to the support, and upon heating the same to set the binder, the salt will be decomposed and porosify the active material.

Ammonium carbonate is a satisfactory porosity salt because it decomposes into ammonia, and carbon dioxid and water vapor upon the application of heat, and leaves no residue. Various binding substances may be employed, such as rubber and celluloid, the rubber being incorporated with sulfur to enable the same to be vulcanized by heating, and the celluloid being incorporated in solution with a solvent such as acetone, which solvent may be volatilized to set the celluloid. The ammonium carbonate or an equivalent salt that decomposes on heating will produce sufficient gas to porosify the plastic material, the decomposition occurring when the binder is in condition to permanently retain the pores produced in it.

The relative proportions of active material, binder and porosity salt may vary. A satisfactory composition, for example, may contain by weight about 90% of active material such as lead peroxid; about 10% binder such as rubber; and a porosity salt such as ammonium carbonate in amount up to about 5% of the rubber content depending on the degree of porosity desired.

In the manufacture of storage battery separators substantially the same procedure may be followed. Absorbent material such as sulfite fibers, cotton linters or the like may be impregnated with a solution of the porosity salt before the plastic acid-resistant binding material such as rubber or celluloid is applied thereto, the impregnated fibrous material being first dried before the application of the binder. Secondly, the porosity salt may be mixed or incorporated in the plastic acid-resistant binder before the absorbent material of the separator is impregnated therewith; and thirdly, the absorbent material, the porosity salt and the plastic binder may be mixed together in one operation, and the separators may be fabricated from such mixture. In each instance heat is applied to set the binder and decompose the porosity salt, thereby rendering the separator porous.

Ammonium carbonate may also be used to porosify separators. The relative proportions of absorbent material, binder and porosity salt may be varied. A satisfactory separator, for example, may contain by weight about 85% of absorbent material such as sulfite fiber; about 15% acid-resistant binder such as rubber; and a porosity salt such as ammonium carbonate in amount up to about 5% of the rubber content.

To set the rubber binder, for example, the material of the element is desirably gradually heated up to the vulcanization temperature which is about 145 degrees C. and during such heating the ammonium carbonate, which has a decomposition temperature of about 85° C., is decomposed, the major portion of the decomposition occurring when the rubber has become sufficiently rigid to retain the pores produced by the decomposition products.

The terms "element" and "elements" in the specification and claims are intended to designate separators as well as plates or electrodes, inasmuch as the process of obtaining a porous body by using a porosity salt such as ammonium carbonate is applicable to both separators and plates.

I claim:

1. Process of making a storage battery element that comprises incorporating therein material that produces a gas on heating, and heating such element to gasify the material, whereby the element is rendered porous.

2. Process of making a storage battery element that comprises mixing with the material entering into said element a substance that decomposes on heating and produces a gas, and heating such mixture whereby gas is evolved and said element is rendered porous.

3. Process of making a storage battery element that comprises incorporating an acid-resistant binding substance in the material of said element, and incorporating another substance therein that decomposes and produces a gas when such mixture is heated to set said binding substance.

4. Process of making a storage battery element that comprises mixing a small amount of ammonium compound with the material forming the body of said element, and heating such mixture to cause decomposition of said compound and evolution of gas adapted to render said element porous.

5. Process of making a storage battery element that comprises incorporating in the principal material thereof an acid-resistant binding substance and a small amount of decomposable ammonium carbonate, and heating the same to set the binder and to decompose said carbonate to form gas which will porosify the binder and said element.

6. Process of making storage battery elements that comprises incorporating or mixing a small amount of ammonium carbonate and plastic acid-resistant binding substance with the principal material of the element, and heating such mixture to set the binding substance and also to decompose the ammonium carbonate to porosify the material and binding substance.

7. Process of making storage battery separators that comprises incorporating or mixing a small amount of ammonium carbonate and plastic binding substance with fibrous material, and heating such mixture to set the binding substance and also to decompose the ammonium carbonate to porosify said separator.

In testimony whereof, I affix my signature.

LEROY C. WERKING.